(12) United States Patent
Arcese et al.

(10) Patent No.: US 9,009,717 B2
(45) Date of Patent: Apr. 14, 2015

(54) MANAGING SCHEDULING OF PROCESSES

(75) Inventors: Mauro Arcese, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 13/499,580

(22) PCT Filed: Aug. 24, 2010

(86) PCT No.: PCT/EP2010/062321
§ 371 (c)(1),
(2), (4) Date: Mar. 30, 2012

(87) PCT Pub. No.: WO2011/051011
PCT Pub. Date: May 5, 2011

(65) Prior Publication Data
US 2012/0185862 A1     Jul. 19, 2012

(30) Foreign Application Priority Data
Oct. 29, 2009    (EP) .................................. 09174405

(51) Int. Cl.
*G06F 9/46*       (2006.01)
*G06F 9/48*       (2006.01)
(52) U.S. Cl.
CPC ................................. *G06F 9/4881* (2013.01)

(58) Field of Classification Search
CPC ............................ G06F 9/4881; G06F 9/4843
USPC ....................................................... 718/103
See application file for complete search history.

(56) References Cited

U.S. PATENT DOCUMENTS

| | | | |
|---|---|---|---|
| 5,432,932 A | 7/1995 | Chen et al. | |
| 6,212,544 B1* | 4/2001 | Borkenhagen et al. | 718/103 |
| 6,668,269 B1 | 12/2003 | Kamada et al. | |
| 7,171,669 B2 | 1/2007 | Jones et al. | |
| 2005/0080824 A1 | 4/2005 | Vaidyanathan et al. | |
| 2008/0172419 A1* | 7/2008 | Richards et al. | 707/200 |
| 2011/0107342 A1* | 5/2011 | Dodge et al. | 718/103 |

OTHER PUBLICATIONS

McKusick et al., The Design and Implementation of the FreeBSD Operating System, Aug. 2, 2004, Addison-Wesley Professional, Chapter 4. Process Management p. 79-134.*
Capacitas, Understanding Percentage Waiting for I/O, Mar. 6, 2005, Capacitas.*
"About Processes and Threads", Microsoft Corporation, http://msdn.microsoft.com/en-us/library/windows/desktop/ms681917(v=vs.85).aspx, retrieved Sep. 25, 2012, 2 pages.

(Continued)

*Primary Examiner* — Emerson Puente
*Assistant Examiner* — Steven Do
(74) *Attorney, Agent, or Firm* — Stephen R. Tkacs; Stephen J. Walder, Jr.; William J. Stock

(57) ABSTRACT

A mechanism dynamically modifies the base-priority of a spawned set of processes according to their actual resource utilization (CPU or I/O wait time) and to a priority class assigned to them during their startup. In this way it is possible to maximize the CPU and I/O resource usage without at the same time degrading the interactive experience of the users currently logged on the system.

20 Claims, 3 Drawing Sheets

(56) References Cited

OTHER PUBLICATIONS

"Operating Systems (CS/CPE 408):CPU Scheduling", http://www1bpt.bridgeport.edu/sed/projects/cs503/Spring_2001/kode/os/scheduling.htm, retrieved Sep. 25, 2012, 6 pages.
Love, Robert, "The Linux Process Scheduler", Chapter 3:Scheduling, informIT, https://www.cs.drexel.edu/~wmm24/cs370/resources/Scheduler.pdf, Nov. 13, 2003, 14 pages.
Schemitz, Patrick, "AND auto nice daemon", http://and.sourceforge.net/index.html, XP-002619827, printed Jan. 28, 2011, 2 pages.
Schemitz, Patrick, "and(8)—Linux man page", XP-002619826, retrieved Jan. 28, 2011, 8 pages.
"FreeBSD System Managers Manual", http://www.freebsd.org/cgi/man.cgi?query=renice&apropos=0&sektion=0&manpath=FreeBSD+8.1-RELEASE&format=pdf, XP-002619828, Jun. 9, 1993, 1 page.
Huang, Wayne et al., "CPU monitoring and tuning", IBM Corporation, http://www.ibm.com/developerworks/aix/library/au-aix5_cpu/, retrieved Mar. 5, 2012, 16 pages.
McKusick, Marshall K. et al., "Introduction to Process Management", Chapter 4, Section 4.1 Scheduling, XP-002619825, Oct. 2004, pp. 81, 86, 87 and 100-103.
IBM Corporation, Redbooks, "System Programmer's Guide to: Workload Manager", http://www.redbooks.ibm.com/abstracts/sg246472.html?Open, printed Mar. 30, 2012, 2 pages.

\* cited by examiner

MANAGING SCHEDULING OF PROCESSES

BACKGROUND

The present invention generally relates to scheduling of processes in a computer. More particularly, the invention aims at dynamically monitoring and adapting the priority of a tree of processes.

Process scheduling in operating systems dispatches processes for execution on the available CPUs of the computer. The scheduling algorithm must take into account the different types of processes which may have different CPU and I/O consumption. Also the scheduler of the operating system has to optimize global CPU usage and to respect a same CPU time for each thread.

Nowadays there are plenty of process-scheduling algorithms adopted by the modern operating systems to assign priorities to processes. The main purpose of such process-scheduling algorithms is to minimize resource starvation and to ensure fairness amongst the parties utilizing the resources. To achieve this goal, the operating system schedulers dynamically modify the actual priority of the process in their internal scheduling queue, for example by assigning a temporary priority burst to a process in specific situations (i.e. at the end of an I/O operation). Some operating systems, such as the IBM AIX® operating system (AIX is a trademark of International Business Machine Corp., registered in many jurisdictions worldwide, allow even to globally modify the adopted scheduling algorithm.

Additionally, operating systems usually provide commands and application programming interfaces (APIs) that can be used to modify and tune the priority of a specified set of processes. For this purpose, a set of system services are available in various operating systems: nice, renice for the Linux™ operating system (LINUX is a registered trademark of Linus Torvalds in the United States, other countries, or both); set_priority in the Java™ programming language (JAVA and all Java-based trademarks and logos are trademarks of Sun Microsystems, Inc. in the United States, other countries, or both) and SetPriorityClass, SetThreadPriority are examples of process functions for Windows® operating system (Microsoft, Windows, Windows NT, and the Windows logo are trademarks of Microsoft Corporation in the United States, other countries, or both), a thread being a basic unit to which the operating system allocates processor time, a process being an executing application that consists of one or more threads.

Even if the scheduling algorithms generally do a good job in dispatching and assigning the right priorities to the executing processes, there are situations when the embedded scheduling policies are not enough to manage in an effective way how a specific set of processes have to be executed. Typical examples of such processes are long-running system management processes, such as the execution of an Inventory scan on a machine. These kinds of operations are usually long-running tasks comprising different phases with different characteristics from a CPU-I/O consumption point of view. They include very CPU-intensive phases followed by I/O-bound operations followed again by a CPU-bound phase and so on. Additionally, such tasks usually spawn child processes to perform some of the steps of the primary task.

Since each process started on an operating system has a fixed base priority (defined by the command used to spawn it) usually, a long-running process with time-varying characteristics from a CPU-usage and I/O-usage point of view may not be properly managed by the operating system scheduler during its whole life.

Starting such a long-running process with a lower base-priority would be good during the CPU-intensive phases so that other system activities, and in particular interactive applications, would not be disturbed too much. On the other hand, having a lower priority may degrade a lot the execution time during I/O intensive phases resulting in an overall long execution time. Vice versa, using a higher priority would be beneficial during the I/O intensive phases but would degrade a lot the responsiveness of the system for interactive applications during the CPU-intensive phases.

One solution to manage process priorities is implemented in the z/OS® Worload Manager product described in the IBM (z/OS is a trademark of International Business Machine Corp., registered in many jurisdictions worldwide) redbook SG24-6472-03 at: http://www.redbooks.ibm.com/abstracts/sg246472.html?Open In z/OS® Workload Manager, a contract is made (Service Level Agreement, STA) between the installation (user) and the operating system. The installation classifies the work running on the z/OS® operating system in distinct service classes and defines goals for them that express the expectation of how the work should perform. These goal definitions are used, along with the different workload priorities, to manage the work across all systems of a sysplex environment. This ensures that defined SLAs get respected, and that, eventually, competing workload gets moved to different regions. This control on priority of process execution does not answer the need for adapting priority of a running process as it changes its behavior during the execution in the context of a single machine (i.e. a desktop computer).

SUMMARY one illustrative embodiment, a method is provided to manage processes running on a computer system, each running process being distributed computing resources and assigned a current process priority. The method comprises selecting a set of processes among said computer processes and assigning them a process priority class determined from the type of consumption that said selected processes make of the computing resources. The method further comprises initializing monitoring of the selected processes to which a process priority class has been assigned. The method further comprises, for each monitored process, collecting, on a first regular time basis, computing resources used by said monitored process; computing on a second regular time basis, on a past period of time, an average value of the collected computing resources and determining a process priority for said monitored process by applying a rule adapted to the process priority class assigned to said monitored process; and changing the current priority of said monitored process into the determined process priority.

In another illustrative embodiment, a system for managing processes running on a computer is provided. The computer comprises an operating system monitored using an interface, the operating system being adapted to distribute computing resources to each running process and to assign them a current process priority which can be changed using a process management interface with the operating system. The system further comprises a management engine for selecting a set of processes among said running processes and assigning them an initial process priority class adapted to the type of consumption that each selected process makes of the computing resources. The system further comprises a monitoring agent for monitoring said selected processes to which a process priority class has been assigned. The monitoring agent is further provided to collect, on a first regular time basis, computing resources used by each running process to be monitored, and to transmit to the Management Engine said collected computing resources of each monitored processes. The management engine is further configured to compute for each monitored process, on a second regular time basis, on a past period of time, an average value of the collected computing resources, determine a process priority for each monitored process by applying a rule adapted to the process priority class and change the current priority of the monitored process into the determined process priority.

DETAILED DESCRIPTION

Figure 1:
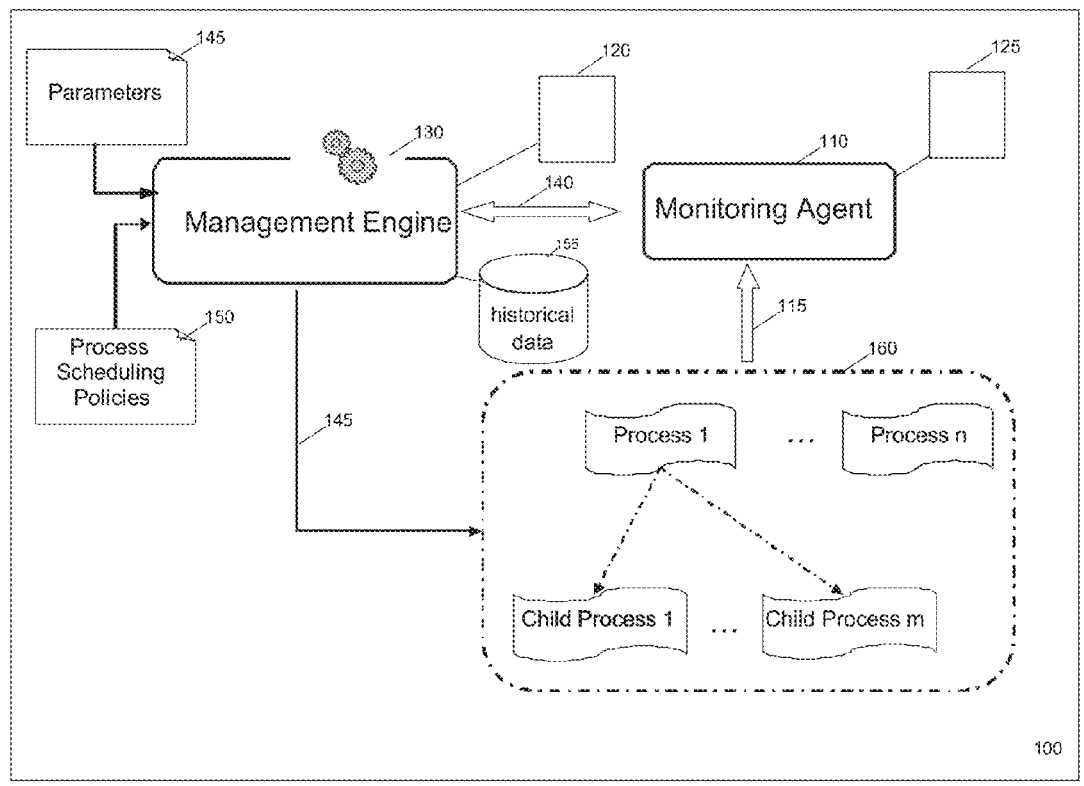
FIG. 1 shows the main components of a system for managing scheduling of processes in accordance with an illustrative embodiment.

FIG. 1 shows the main components of a system for managing scheduling of processes in accordance with an illustrative embodiment.

A Monitoring Agent (110) continuously monitors the CPU usage and I/O activity (115) of a list of processes (120) for which the priority is managed by a Management Engine (130) during their execution. It is noted that a corresponding list of processes (125) monitored by the Monitoring Agent is maintained by the Monitoring Agent. These two lists should be synchronized. One other embodiment is when the lists (120, 125) are merged into a unique list shared both by the Management Engine and the Monitoring Agent, in the case, for example, where the Management Engine and the Monitoring Agent are located on the same computer (100).

The Monitoring Agent collects the CPU usage and I/O activity and sends (140) such metrics to the Management Engine (130). The Management Engine receives metrics from the Monitoring Agent and may adjust the priority of the monitored processes (145) according to a set of pre-configured policies (150). The adjusted priority is computed by the Management Engine using historical data of the metrics stored in a repository (155).

The box in dotted line (160) encompasses the set of processes managed by the Monitoring Engine. Other processes run on the same operating system that are not included in the figure. The components of the system of the illustrative embodiment described in FIG. 1 may act on a subset of all the processes running in the computer (100).

The Monitoring Agent must be located on the same machine as the computer (100) executing the processes. The application programming interfaces (APIs) for monitoring a process must be called on the same operating system where the processes are running since they require access to the operating system (OS) kernel to extract the related metrics. So at least a minimum amount of code must run on the local machine to extract such information. The Monitoring Engine can be located on the same machine but could also be located on a different machine and could remotely communicate with the Monitoring Agent and could remotely change the processes priorities.

It is noted that the set or processes (160) monitored by the Monitoring Agent at a given time may have spawn processes. In FIG. 1 'Child Processes' are spawn processes. Other processes may run which are not monitored by the system of the invention but under the unique scheduling of the operating system. The system of the invention applies to a subset of all the running processes.

Generally, with the operating system scheduling, a spawn process inherits the same priority of its parent process. However, when a parent process spawns a Child Process an operating system may seta different priority to the Child Process. As explained later in reference to FIG. 2, with the illustrative embodiment the operating system assigns a default priority to each spawned process unless an optional configurable flag is specified by the user that tells if the Monitoring Engine has also to control the priority of the spawned process over time.

The protocol between the Monitoring Agent (110) and the operating system for collecting metrics (115) is dependent on the operating system itself. In general, each operating system has its own way to provide metrics about running processes. For example with Windows® operating system, such data can be accessed through a set of public APIs and counters. On UNIX systems similar mechanisms are available.

The protocol between the Management Engine and the operating system is usually represented by a set of public APIs (or also command line tools) that the operating system exposes to the users. Through such APIs/tools the Management engine is able to stop/stall processes and to change their priorities. As already mentioned, a few examples of such APIs/tools are nice, renice for Linux™ operating system; set_priority Java™ programming language and SetPriorityClass, SetThreadPriority which are process functions for Windows® operating system.

Figure 2:
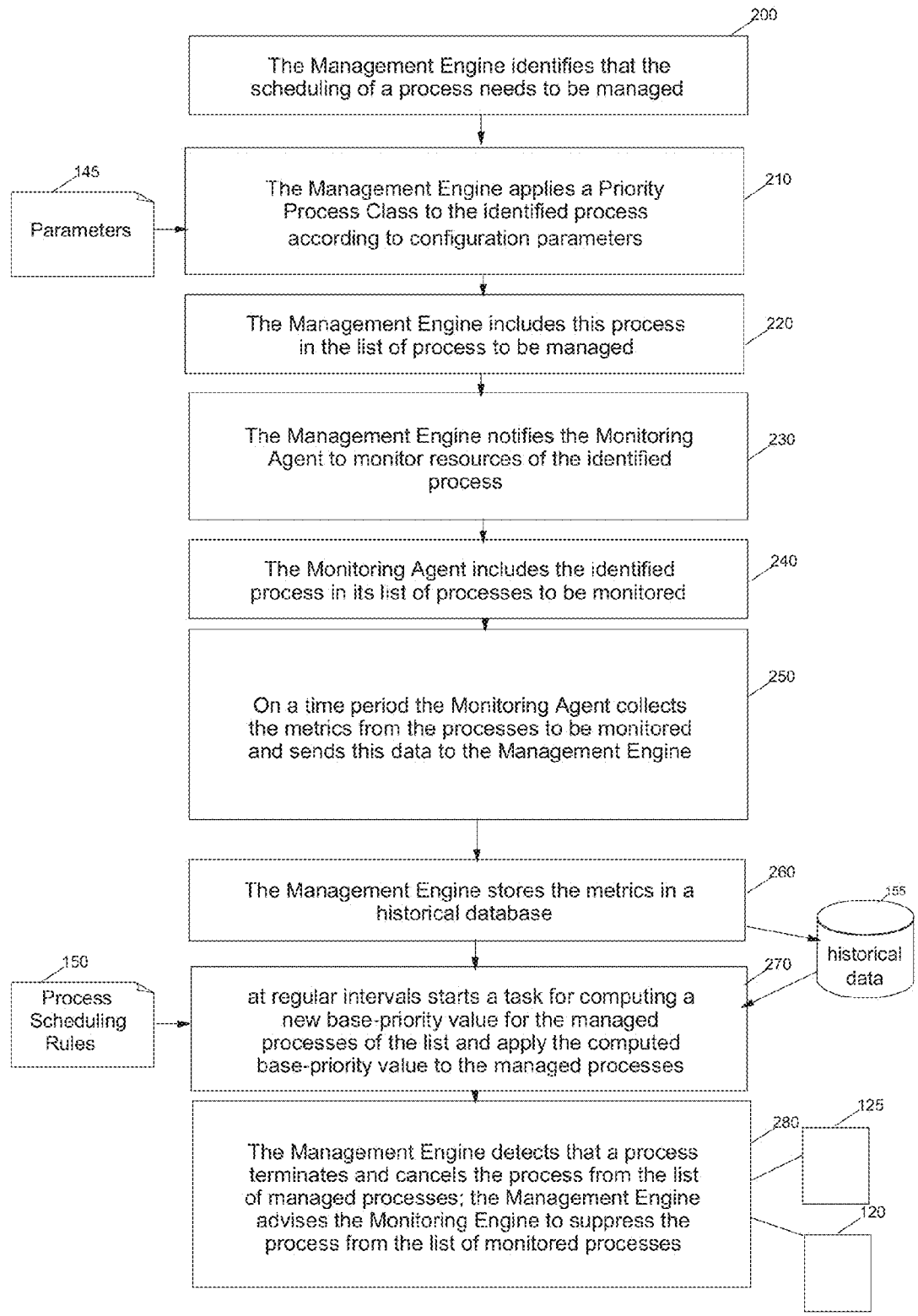
FIG. 2 is the flowchart illustrating operation of managing scheduling of processes in accordance with an illustrative embodiment.

FIG. 2 is the flowchart illustrating operation of managing scheduling of processes in accordance with an illustrative embodiment. Assuming a task is activated, the execution of an inventory scan to identify ail the software codes installed on a machine, for instance. The Management Engine identifies the process (200) which is running by its process id and assigns (210) to this process a specific Process Priority Class. The assignment of a Process Priority Class is a way to categorize in the working space of the Management Engine the processes under control. This Process Priority Class is used later on by the Management Engine to decide how to modify the base-priority of the process.

Examples of priority classes can be considered:
Long-running CPU-bound and I/O-bound operation
Long-running CPU-bound operation
Long-running I/O-bound operation
Short-running operation The Management Engine assigns a Process Priority Class to a process according to configuration parameters (145) entered by the administrator. The configuration parameters associate a process id to a Process Priority Class. In the illustrative embodiment, the Management Engine controls the executing processes by initially assigning a Process Priority Class to processes for which the execution has been started independently. In one other embodiment, the same Management Engine is also in charge of starting the processes to be controlled and assigns the Process Priority Class to them. As a matter of fact, the Management Engine may use two different ways to manage a process:

1. By directly starting a process, through a command line or GUI that the user may leverage for this purpose.

2. By taking control of an already started process, through a command line or GUI that the user may leverage for this purpose.

In both cases, the interface used to start the process or to take control of an already running process, among other things, may prompt the administrator that a Priority Class is to be assigned to the process. Or, alternatively, the Priority Class may be assigned by averaging the Configuration Parameters of the Management Engine: some of such parameters may be used to specify the association between a given process executable and its Priority Class. As an example, when a process associated to an executable called 'wscanfs' gets started, the system automatically assigns to it the Priority Class specified in this configuration.

The Management Engine includes (220) the process to which a Process Priority Class has been assigned in the list of processes (120) managed by the Management Engine.

The Management Engine notifies (230) the Monitoring Agent about the new process to be monitored.

The Monitoring Agent adds (240) the new process to the list of the monitored processes (125).

At regular intervals (for example twice per second), the Monitoring Agent sends (250) to the Management Engine the CPU and the I/O metrics related to the configured process list.

Upon receiving such data the Management Engine stores them into its internal historical repository (260).

At regular intervals, a separate thread started from the Management Engine infers the resource utilization (CPU and I/O) from a history analysis of the CPU and I/O metrics. The so called regular intervals are in general different from the time intervals used by the Monitoring Agent to send the data.

Figure 4:
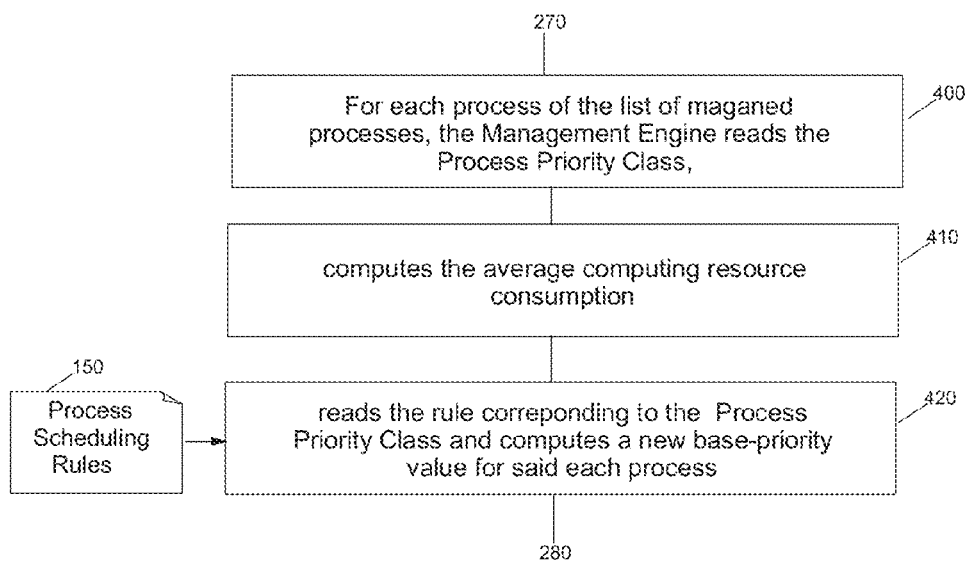
FIG. 4 illustrates adjusting the process priority during execution in accordance with an example embodiment.

Using the so calculated average values the Management Engine automatically re-calibrates (270) the base-priority assigned to each monitored process. FIG. 4 illustrates this step (270) of adjusting the process priority during their execution.

The logic to re-calculate a new base-priority value leverages the Process Priority Class assigned to the process. To each Process Priority Class is associated a rule (150) that specifies how to determine the new base-priority of the spawned processes based on the latest calculated metrics. The Management Engine reads (400) the rule (150) corresponding to the Process Priority Class of the process in the list of processes to be managed and computes the average computing resource consumption (410).

Figure 3:
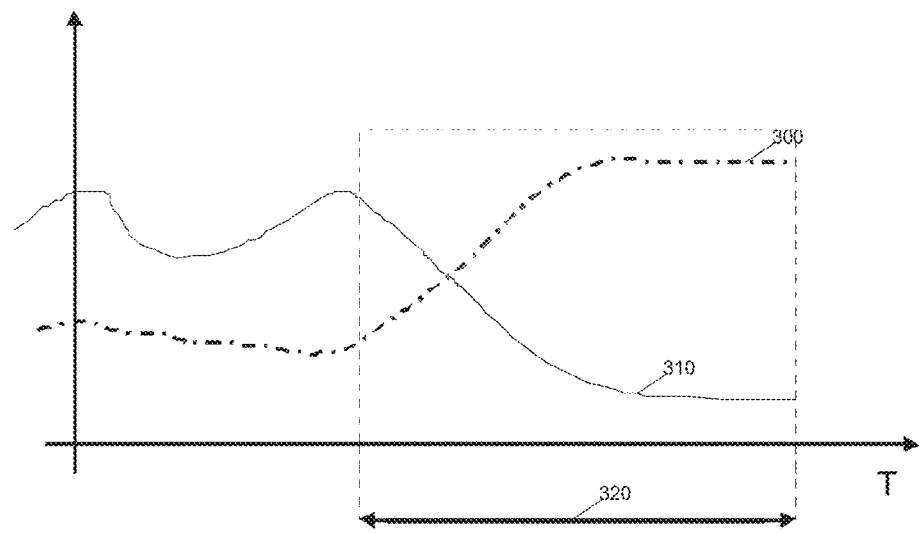
FIG. 3 illustrates how the resource utilization are computed according to an illustrative embodiment.

FIG. 3 illustrates how the resource utilization are computed according to an illustrative embodiment. Using the stored historical data, the average values for those CPU (310) and I/O wait (300) configuration parameters are computed in an evaluation window (320) that starts from the current timestamp and goes back in time up to a pre-defined configurable limit. The pre-defined configurable limit is defined as a configuration parameter (145) of the Management Engine.

The Management Engine reads the rule corresponding to the Process Priority Class and computes (420) a new base-priority value for said each process using this rule.

Just as an example, for long-running processes, whose activities are in some moments CPU-bound and in other moment I/O bounds, the new base-priority could be calculated on the basis of the average values of the CPU and I/O metrics according to the following formula:

$$P_n = P_0 + \left[ \frac{K_1}{T_{CPU}} + K_2 * T_{IO} \right]$$

Where $P_0$, $K_1$ and $K_2$ are constants values while $T_{CPU}$ and $T_{IO}$ represent respectively the average CPU usage and the average percent of time the CPU is idle as it waits for an I/O to complete (I/O wait time). In a nutshell this formula means that the more the CPU usage is compared to the I/O resources usage, the lower the new priority to be assigned to the process and vice versa (It is assumed that the greater the value of $P_n$, the higher the priority of a process). Similar rules could be defined for other priority classes.

It is noted that computing of a new computed base-priority value and its assignment (270) for the processes to be managed by the Management Engine may be extended to the spawn processes. This may be indicated as a configuration parameter (145) of the Management Engine by the administrator.

Then, the Management Engine applies the newly base-priority to the managed processes using an appropriate System tool or system service or a standard API to interface the operating system scheduler. For example, this can be done calling the renice command with Linux™ operating system or leveraging the operating system native APIs of the servers such as the setpri or thread_setsched to set kernel thread scheduling configuration parameters.

The Management Engine detects (280) that the process (and/or its child processes) terminates, removes the process id from the list of the managed processes and indicates the Monitoring Agent to update the list of monitored processes in the same way.

The invention claimed is:

1. A method to manage computer processes running on a computer system, each running process being assigned computing resources and assigned a current process priority, the method comprising:

selecting a set of processes from the computer processes and assigning the set of processes a process priority class within a plurality of process priority classes determined based on a type of resource consumption;

initializing monitoring of the selected set processes; and for each monitored process:

collecting, on a first regular time, basis, CPU usage and I/O wait time metrics for the monitored process;

computing on a second regular time basis, on a past period of time, an average value of the CPU usage metric and an average value of the I/O wait time metric;

reading from a set of pre-configured policies a process scheduling rule corresponding to the assigned process priority class, wherein the process scheduling rule specifies how to determine the process priority as a function of the average value of the CPU usage metric and the average value of the I/O wait time metric;

determining a new process priority for the monitored process by applying the process scheduling rule to the average value of the CPU usage metric and the average value of the I/O wait time metric; and changing the current priority of the monitored process to the determined new process priority.

2. The method of claim 1, wherein selecting the set of processes comprises selecting processes designated by a name of an executable and associated process priority class provided as configuration parameters.

3. The method of claim 1, wherein initializing monitoring of the selected set of processes further comprises initializing monitoring of child processes spawned by the selected set of processes that are to be monitored.

4. The method of claim 1, wherein collecting the CPU usage and I/O wait time metrics comprises receiving the CPU usage and I/O wait time metrics from a monitoring agent located on a computer system executing the selected set of processes.

5. The method of claim 1, wherein the I/O wait time metric represents a percentage of time the CPU is idle as it waits for an I/O operation to complete.

6. The method of claim 1, wherein the plurality of process priority classes comprises:
Long-running CPU-bound and I/O-bound operation,
Long-running CPU-bound operation,
Long-running I/O-bound operation, and
Short-running operation.

7. The method of claim 1, wherein the process priority class is Long-running CPU-bound and I/O-bound operation and wherein determining a process priority for each monitored process comprises applying the following rule:

$$P_n = P_0 + \left[\frac{K_1}{T_{CPU}} + K_2 * T_{IO}\right]$$

where $P_0$, $K_1$ and $K_2$ are constants values and $T_{CPU}$ and $T_{IO}$ represents an average CPU usage and an average I/O wait time, respectively.

8. The method of claim 1, further comprising:
storing the collected computing resources used by the monitored process in a historical database.

9. The method of claim 4, wherein the method is executed by a management engine executing on a computer system that is different from the computer system executing the selected set of processes and wherein the management engine remotely communicates with the monitoring engine.

10. The method of claim 1 wherein each process priority is externally modifiable using an interface to the computer operating system and changing the current priority of the monitored process to the determined process priority is performed using the interface.

11. An apparatus, comprising:
a processor; and
a memory coupled to the processor, wherein the memory comprises instructions which, when executed by the processor, cause the processor to:
select a set of processes from the computer processes and assigning the set of processes a process priority class within a plurality of process priority classes determined based on a type of resource consumption;
initialize monitoring of the selected set of processes; and
for each monitored process:
collect, on a first regular time basis, CPU usage and I/O wait time metrics for the monitored process;
compute on a second regular time basis, on a past period of time, an average value of the CPU usage metric and an average value of the I/O wait time metric;
read from a set of pre-configured policies a process scheduling rule corresponding to the assigned process priority class, wherein the process scheduling rule specifics how to determine the process priority as a function of the average value of the CPU usage metric and the average value of the I/O wait time metric;
determine a new process priority for the monitored process by applying the process scheduling rule to the average value of the CPU usage metric and the average value of the I/O wait time metric; and
change the current priority of the monitored process to the determined new process priority.

12. The apparatus of claim 11, wherein initializing monitoring of the selected set of processes further comprises initializing monitoring of child processes spawned by the selected set of processes that are to be monitored.

13. The apparatus of claim 11, wherein collecting the CPU usage and I/O wait time metrics comprises receiving the CPU usage and I/O wait time metrics from a monitoring agent located on a computer system executing the selected set of processes;
wherein the apparatus comprises a management engine executing on a computer system that is different from the computer system executing the selected set of processes; and
wherein the management engine remotely communicates with the monitoring engine.

14. The apparatus of claim 11, wherein the process priority class is Long-running CPU-bound and I/O-bound operation and wherein determining a process priority for each monitored process comprises applying the following rule:

$$P_n = P_0 + \left[\frac{K_1}{T_{CPU}} + K_2 * T_{IO}\right]$$

where $P_0$, $K_1$ and $K_2$ are constants values and $T_{CPU}$ and $T_{IO}$ represents an average CPU usage and an average I/O wait time, respectively.

15. The apparatus of claim 11, wherein each process priority is externally modifiable using an interface to the computer operating system and changing the current priority of the monitored process to the determined process priority is performed using the interface.

16. A computer program product comprising a non-transitory computer readable storage medium having a computer readable program stored therein, wherein the computer readable program, when executed on a computing device, causes the computing device to:
select a set of processes from the computer processes and assigning the set of processes a process priority class within a plurality of process priority classes determined based on a type of resource consumption;
initialize monitoring of the selected set of processes; and
for each monitored process:
collect, on a first regular basis, CPU usage and I/O wait time metrics for the monitored process;
compute on a second regular time basis, on a past period of time, an average value of the CPU usage metric and an average value of the I/O wait time metric;
read from a set of pre-configured policies a process scheduling rule corresponding to the assigned process priority class, wherein the process scheduling role specifies how to determine the process priority as a function of the average value of the CPU usage metric and the average value of the I/O wait time metric;
determine a new process priority for the monitored process by applying the process scheduling rule to the average value of the CPU usage metric and the average value of the I/O wait time metric; and
change the current priority of the monitored process to the determined new process priority.

17. The computer program product of claim 16, wherein initializing monitoring of the selected set of processes further comprises initializing monitoring of child processes spawned by the selected set of processes that are to be monitored.

18. The computer program product of claim 16, wherein collecting the CPU usage and I/O wait time metrics comprises receiving the CPU usage and I/O wait time metrics from a monitoring agent located on a computer system executing the selected set of processes;

wherein the computer readable program comprises a management engine executing on the computing device that is different from the computer system executing the selected set of processes; and wherein the management engine remotely communicates with the monitoring engine.

19. The computer program product of claim 16, wherein the process priority class is Long-running CPU-bound and I/O-bound operation and wherein determining a process priority for each monitored process comprises applying the following rule:

$$P_n = P_0 + \left[\frac{K_1}{T_{CPU}} + K_2 * T_{IO}\right]$$

where $P_0$, $K_1$ and $K_2$ are constants values and $T_{CPU}$ and $T_{IO}$ represents an average CPU usage and an average I/O wait time, respectively.

20. The computer program product of claim 16, wherein each process priority is externally modifiable using an interface to the computer operating system and changing the current priority of the monitored process to the determined process priority is performed using the interface.

\* \* \* \* \*